US007895455B2

(12) United States Patent
Green et al.

(10) Patent No.: US 7,895,455 B2
(45) Date of Patent: Feb. 22, 2011

(54) DYNAMIC CONVERTER CONTROL FOR EFFICIENT OPERATION

(75) Inventors: Alan M. Green, Tomball, TX (US); Alan L. Goodrum, Tomball, TX (US)

(73) Assignee: Hewlett-Packard Development Company, L.P., Houston, TX (US)

(*) Notice: Subject to any disclaimer, the term of this patent is extended or adjusted under 35 U.S.C. 154(b) by 868 days.

(21) Appl. No.: 11/768,102

(22) Filed: Jun. 25, 2007

(65) Prior Publication Data

US 2008/0320322 A1 Dec. 25, 2008

(51) Int. Cl.
*G06F 1/32* (2006.01)
*G06F 1/26* (2006.01)

(52) U.S. Cl. .................. 713/300; 713/310; 713/320; 713/321; 713/322; 713/324; 713/330; 713/340; 307/52

(58) Field of Classification Search ............ 713/300, 713/310, 320–324, 330, 340; 307/52
See application file for complete search history.

(56) References Cited

U.S. PATENT DOCUMENTS

| 5,918,061 | A | 6/1999 | Nikjou | |
|---|---|---|---|---|
| 6,154,845 | A | 11/2000 | Ilkbahar et al. | |
| 6,304,981 | B1 * | 10/2001 | Spears et al. | 714/24 |
| 7,007,077 | B1 * | 2/2006 | Shinohara et al. | 709/220 |
| 7,032,119 | B2 | 4/2006 | Fung | |
| 7,043,647 | B2 * | 5/2006 | Hansen et al. | 713/320 |
| 7,082,042 | B2 | 7/2006 | Harris | |
| 7,222,246 | B2 | 5/2007 | Pomaranski | |
| 2004/0158771 | A1 * | 8/2004 | Garnett et al. | 714/14 |
| 2005/0067902 | A1 * | 3/2005 | Bemat et al. | 307/140 |
| 2005/0154931 | A1 | 7/2005 | Oh | |
| 2005/0172157 | A1 | 8/2005 | Artman | |

FOREIGN PATENT DOCUMENTS

EP 1734436 12/2006

OTHER PUBLICATIONS

Hewlett Packard Co, HP BladeSystem p-Class 1U Power Enclosure Installation Instructions, Feb. 2005.

* cited by examiner

*Primary Examiner*—Abdelmoniem Elamin

(57) ABSTRACT

Dynamically managing power consumption in a computer system having at least two parallel power converters in order to improve efficiency. A maximum power capacity for each of the power converters is determined and then power consumption of the computer system is monitored. If the power consumption of the computer system can be provided by less than all of the parallel power converters then one or more of the power converters is turned off, such that a reduced number of parallel power converters remains turned on. A reduced maximum power capacity of the reduced number of parallel power converters is determined and a power cap value is set for the computer system that is less than or equal to the reduced maximum power capacity. The computer system is throttled at the power cap to prevent power consumption of the computer system from exceeding the power cap value.

19 Claims, 5 Drawing Sheets

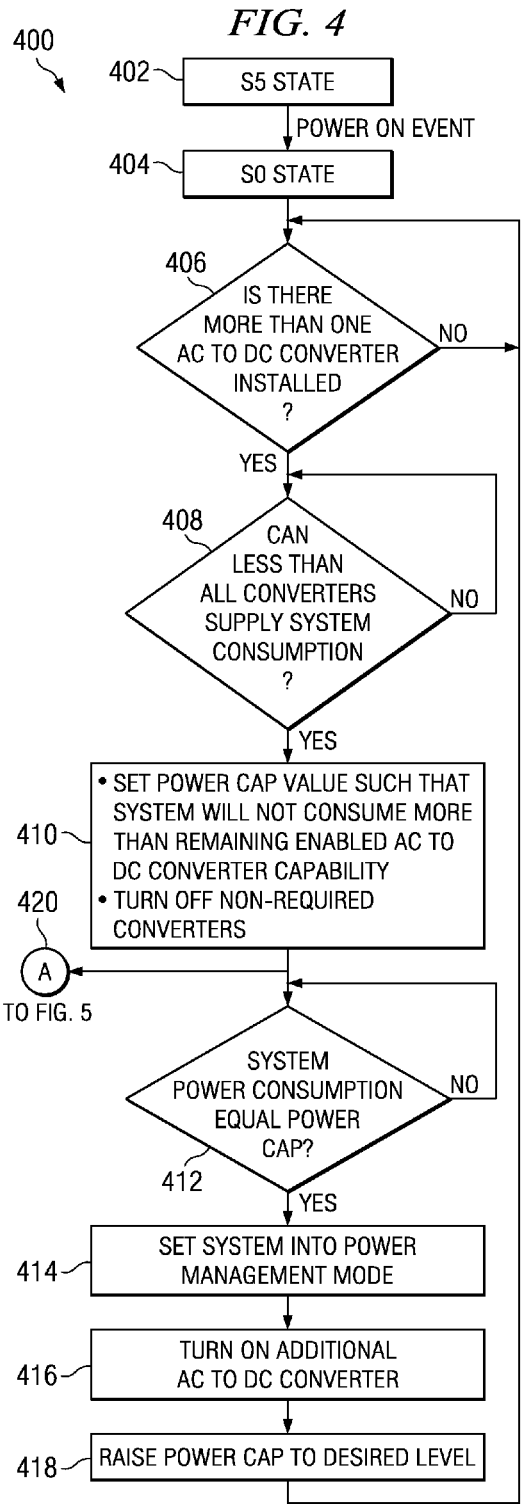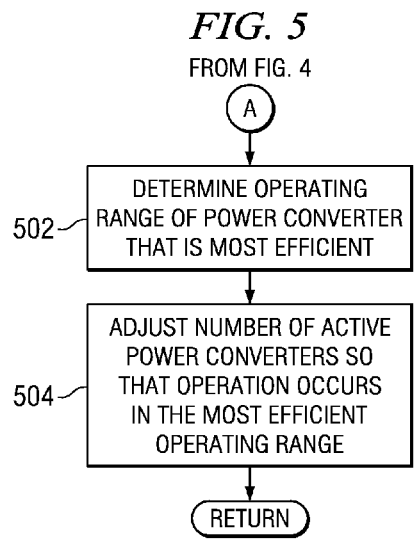

DYNAMIC CONVERTER CONTROL FOR EFFICIENT OPERATION

FIELD OF THE INVENTION

This invention generally relates to computer systems, and more particularly to computer systems having multiple AC to DC power converters.

BACKGROUND OF THE INVENTION

A server is a computer connected to a network with components similar to the typical personal computer (PC) such as a microprocessor, memory chips, and disc drives. But because the server communicates with other computers, the keyboard and video display are not necessary. Also like the typical PC, the server has a power supply and needs to dissipate heat roughly equal to the total electrical power input to the device. A typical rack or cabinet is 24- to 30-in. wide, 36- to 44-in. long and 76-in high and can incorporate up to 42 U of computing equipment. "U" is a standard unit indicating the height of the computer server. Each "U" is 1.75 in. A 5 U server is 8.75 in. tall, therefore eight 5 U servers fill a 42 U rack. Like most electronic devices, the processing power and space efficiency of the servers has increased considerably in the last several years.

As the servers have become more compact and efficient, more servers can fit into the rack or cabinet rack. A 42 U cabinet installed five years ago with three U servers has a total cooling load of 3 kW to 4 kW, about one ton of cooling in six sq ft. Today, the same cabinet can be filled with 7 U blade servers having a total power consumption over 20 kW, or more than 5.5 tons of cooling for the same six sq ft. A typical corporate data center can have several hundred cabinets. For example, a legacy computer room designed for 400 2.0-kW racks has an equipment-cooling load of 800 kW of cooling. If the legacy servers in the 400 racks are replaced with 200 racks at say 12 kW each, the equipment load increases from less than 250 tons to over 680 tons with half as many racks. If all 400 racks are upgraded to 12 kW, the cooling system capacity climbs to 1,365 tons! It is imperative to master plan for ultimate power and cooling capability as well as to set an upper limit on the maximum power consumption in a singe rack or cabinet.

Supplying power with back-up or redundancy to computer systems or servers is desirable or required in certain applications. For example, it is becoming increasingly more important to provide mechanisms that minimize unscheduled "down time" in data centers. The term "high availability" (HA) computing is often used to refer to computer systems that include these mechanisms.

HA mechanisms are provided at many levels. For example, a data center may have redundant computer systems so that if one system fails, the workload can be seamlessly shifted to another system. In addition, data may be stored in a disk array subsystem that allows any single disk drive to fail without affecting the ability of the disk array subsystem to continue operating.

One of the most important aspects of HA computing is ensuring that computer circuits receive an uninterrupted supply of DC power. Typically, a loss of DC power is caused by a loss of AC power to the AC-to-DC power supplies, or a failure of an AC-to-DC power supply. Uninterruptible AC power supplies address the problem of AC power loss by providing a constant supply of AC power to AC-to-DC power supplies. Typically, uninterruptible power supplies are implemented using rechargeable batteries, and in some cases, generators.

Redundant AC-to-DC power supplies address the problem of AC-to-DC power supply failure. In the prior art, redundant power supplies have been deployed on a "per system" basis. Typically, one redundant power supply is provided for each system, which is known in the art as "N+1" redundancy.

Computer systems also use DC-DC conversion since in many cases it is more efficient to provide AC-DC conversion to a single high DC voltage (typically 48V), then bus this voltage to second stage down-converters. In many cases, these DC-DC conversion devices are also required to be redundant.

BRIEF DESCRIPTION OF THE DRAWINGS

Particular embodiments in accordance with the invention will now be described, by way of example only, and with reference to the accompanying drawings:

FIG. 4 is a flow chart illustrating operation of dynamic power management in the systems of FIG. 1 and FIG. 2;

FIG. 5 is another aspect of the dynamic power management scheme of FIG. 4;

DETAILED DESCRIPTION OF EMBODIMENTS OF THE INVENTION

Figure 3:
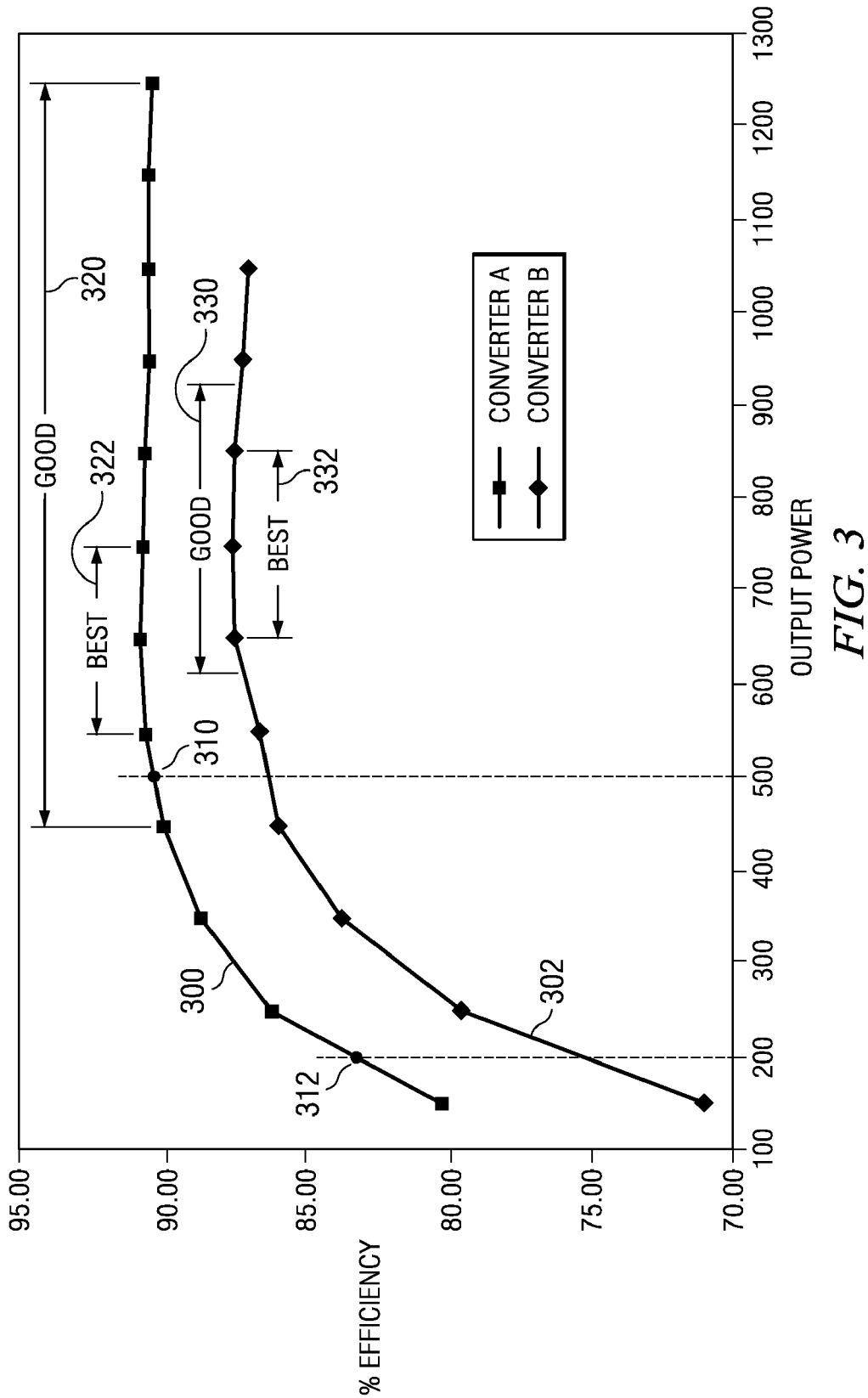
FIG. 3 includes efficiency profiles of two representative power converters.

In order to control and reduce the burgeoning power consumption in computer systems and computer datacenters, every component of the computer system must be considered. The AC to DC converters used to provide power to a computer system have an efficiency rating which describes how much input power would be needed to supply a specific output power. For example, a converter that has an 80% efficiency rating at 100 W output would require 100 W/80%=125 W of input power to attain that output. Efficiency ratings are not linear, nor are they uniform. They are curves that increase in efficiency from lower power, peak at a high power and then generally drop off at maximum power output. FIG. 3 illustrates efficiency profiles 300, 302 of two representative power converters. It is clear that keeping the power converters operation in the higher efficiency range requires less overhead. For example, for a rack of 20 servers all at the 79% efficiency portion of the curve, the datacenter will be required to allocate 21% more input power than what is actually needed to run the circuitry on the server.

Computer systems typically have several power converters connected in parallel for capacity and redundancy reasons. The capacity of the power converters must be sufficient to power the power consumed by the computer when it is operation at maximum throughput. However, for fault tolerance and high availability reasons, additional converters are provisioned so that if one or more converter fails, there will still be sufficient capacity to meet the needs of the computer system. Many systems have full redundancy, with one set of power converters connected to one source of AC and another set of converters connected to a separate source of AC so that a failure in one of the AC systems does not compromise operation of the computer system. For example, a server that consumes 1,000 W at full throughput may have two AC to DC converters connected in parallel that each can provide a maximum of 1,000 W. In this configuration, each converter will generally be providing 500 W. Referring again to FIG. 3, if converters of Type A are being used, the system will be operating at approximately 90% efficiency as indicated at point 310. Thus, if one fails the other can still satisfy the power consumption requirement.

Often, however, the computer system is not operating at maximum throughput. Similarly, tens or hundreds of servers in a datacenter may be idling or operating at low performance levels while other servers in the datacenter are handling the computing load. In these situations, a large number of power converters are operating at low efficiency points. For example, if the computer is operating at a performance level that requires only 400 W, then each of the two converters are only providing 200 W and the system is operating at only 83% efficiency, as indicated at point 312. It has now been discovered that by turning off one of the two AC to DC converters, each that was supplying 200 W of the 400 W total to the system, the remaining AC to DC converter that is enabled will supply the full 400 W making the system 89% efficient, with only an 11% overhead. This reduction in electrical loss translates to less power required to be allocated to racks that contain several of these servers. It also can translate into cost savings by reduction in electricity bills. If a server has more than one AC to DC converter in parallel installed, a dynamic power management system can detect how much power the server is consuming and dynamically turn on and off converters in an effort to keep the load on every converter near its maximum efficiency point.

Figure 1:
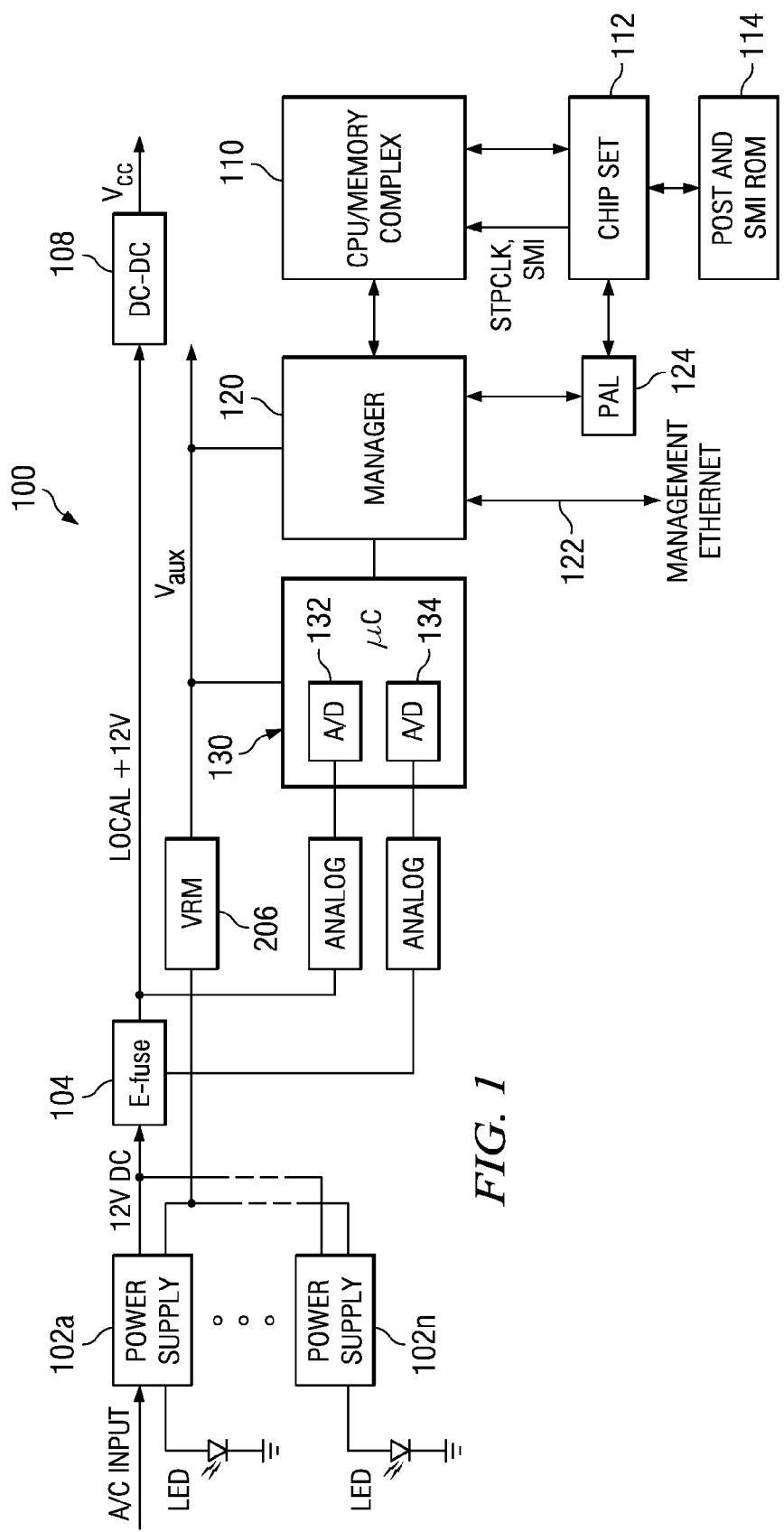
FIG. 1 is a block diagram of a computer system with multiple parallel AC to DC converters, with power consumption detected at a central location.

FIG. 1 is a block diagram of a computer system 100 with multiple parallel AC to DC converters 102a-102n. In this system, the 12v DC output of each of the power converters is connected in parallel and supplied to the server via an electronic fuse 104. Each converter 102a-102n incorporates load balancing circuitry so that the total load is shared approximately equally by each of the converters. Voltage regulation module (VRM) 106 provides an auxiliary voltage (Vaux) that is generally available even when main system power is not turned on. DC to DC converter 108 receives the local 12v DC output and converts it to whatever voltage Vcc is required to operate the various components of the server. An LED is connected to each power converter and displays the operating status of the converter.

The main computing portion of server 100 includes CPU and memory complex 110, processor chip set 112 and non-volatile storage read only memory (ROM) 114 that stores various firmware execution routines such as power on self test (POST) and system management mode interrupt routines (SMI). CPU and memory complex 110 is representative of a server CPU and memory system and various embodiments of server 100 may have different configurations of CPUs main memory, cache and non-volatile memory included in representative CPU and memory complex 110. In this embodiment, the processor chip set is compatible with the industry standard Intel x86 architecture, but the dynamic power management technique described herein is not limited to x86 systems. Various embodiments of the server may include one, two or more processor chip sets or one, two or more processor cores within a single chip set. Any type of processor system that incorporates power conversion can benefit from this technique. Mass storage devices, networking devices and various other support circuitry are included within server 100 but are not shown in this figure.

Management subsystem 120 operates from the auxiliary voltage and is therefore generally in operation, even when the server is not. This subsystem allows the server to be controlled from a remote location. By design, servers are generally "headless" and do not include a user interface. Management subsystem 120 connects to an Ethernet link 122 or other communication channel so that a system administrator can control the server. The system administrator console may be located in the datacenter, or the datacenter may be a "lights out" facility and the administrator console is located in a remote location, such as in another building or in another city.

Management subsystem 120 communicates with and controls power monitoring subsystem 130. Monitoring subsystem 130 includes analog/digital (A/D) circuits 132, 134. A/D 132 is connected to continuously measure the voltage of the local 12v power bus. A/D 134 is connected to fuse component 104 and measures a voltage drop across a series resistive element from which monitoring circuit 130 can infer the current being provided to server system 100. Knowing voltage and current, the monitoring subsystem can calculate instantaneous power consumed by server 100. Other embodiments may sense current using other known or later discovered techniques and components, such as hall effect devices, voltage drop across a semiconductor junction, field strength detectors, etc.

This is actually a measure of the output power of the power supplies, not the total power consumed by the server 100, which would include the power lost to power supply inefficiency. In another embodiment, power input to the power supplies could be measured using techniques similar to the ones described above. Power output from the power converter could then be inferred by using an efficiency curve for the power converter, as illustrated in FIG. 3. In like manner, if power supply output power is measured as described above, power supply input power can be inferred by using the efficiency curve. Either or both power numbers can be reported to the administration system for use in monitoring the operation of the system. Monitoring subsystem 130 is configured to sample the voltage and current in a periodic manner. Average power consumption over time can thus be determined and reported to the remote administration system via management subsystem 120. The instantaneous power consumption values can also be aggregated and reported to the remote administration system to provide a complete picture of power consumption on a server by server basis.

Figure 2:
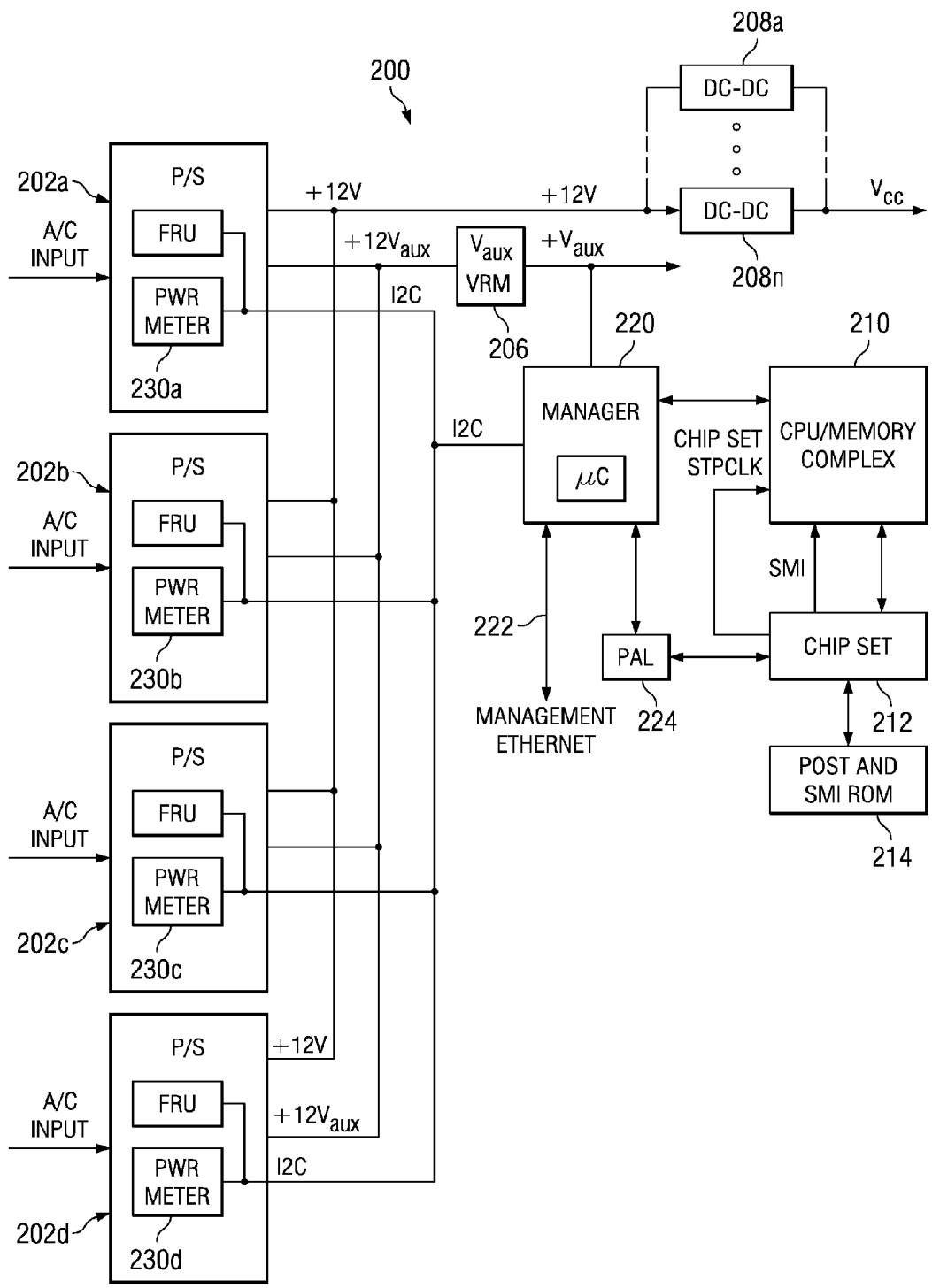
FIG. 2 is a block diagram of a computer system with multiple parallel AC to DC converters and multiple DC to DC converters, with distributed power consumption detection.

FIG. 2 is a block diagram of a computer system 200 with four parallel AC to DC converters 202a-202d and distributed power consumption detection. This embodiment also includes multiple parallel DC to DC converters 208a-208n. In this system, the 12v DC output of each of the power converters is connected in parallel and supplied to the DC to DC converters which then convert the 12v DC to whatever voltage Vcc is required to operate the various components of the server. Each converter 202a-202d incorporates load balancing circuitry so that the total load is shared approximately equally by each of the converters. Voltage regulation module (VRM) 206 provides an auxiliary voltage (Vaux) that is generally available even when main system power is not turned on.

The main computing portion of server 200 includes CPU and memory complex 210, processor chip set 212 and non-volatile storage read only memory (ROM) 214 that stores various firmware execution routines such as power on self test (POST) and system management mode interrupt routines (SMI). CPU and memory complex 210 is representative of a server CPU and memory system and various embodiments of server 200 may have different configurations of CPUs, main memory, cache and non-volatile memory included in representative CPU and memory complex 210. In this embodiment, the processor chip set is compatible with the industry standard Intel x86 architecture, but the dynamic power management technique described herein is not limited to x86 systems. Any type of single or multiple processor system that incorporates power conversion can benefit from this technique. Mass storage devices, networking devices and various other support circuitry are included within server 200 but are not shown in this figure.

Management subsystem 220 operates from the auxiliary voltage and is therefore generally in operation, even when the server is not. As discussed with reference to FIG. 1, this subsystem allows the headless server to be controlled from a remote location through an Ethernet link 222 or other communication channel so that a local and/or remote system administrator can control the server.

Management subsystem 220 communicates with and controls distributed power monitoring subsystems 230a-230d via a simple I2C (inter-integrated circuit) communication bus. Monitoring subsystems 230 each include analog/digital (A/D) circuits that are connected to measure the output voltage of each respective parallel converter 202 and to measure the current provided by each respective parallel converter 202. Knowing voltage and current provided by each and every converter 202, the monitoring subsystem can calculate instantaneous power provided by each power converter and management subsystem 220 can then determine total power consumed by server 200.

In another embodiment, monitoring systems 230 each measure current and voltage input to the power supply to determine power supply input power. Using the power supply efficiency curve, the power output by the power converter can be inferred. The dynamic power management process described herein may be configured to use either power supply input power or power supply output power as a measure of the power consumed by the server.

Monitoring subsystem 230 is configured to sample the voltage and current in a periodic manner. Average power consumption over time can thus be determined and reported to the remote administration system via management subsystem 220. The instantaneous power consumption values can also be aggregated and reported to the remote administration system to provide a complete picture of power consumption on a server by server basis.

Other embodiments may have more than four parallel power converters. As discussed below, there may be advantages to having a larger number of converters in order to optimize efficiency.

As discussed above, FIG. 3 includes efficiency profiles of two representative power converters, converter A and converter B. Converter A has a maximum capacity of approximately 1200 W output power, while converter B has a maximum capacity of approximately 1000 W output power. As discussed above, power converters generally have a lower efficiency when operated at a power levels significantly lower than the maximum design point for the converter. Typically, efficiency peaks at a mid-range operating point and then declines towards maximum output. Converter A peaks at around 91% efficiency at about mid-load (600 w) and then declines insignificantly to about 90.5% efficiency at full load (1200 w). Converter B peaks at around 88% efficiency at about ¾ load (750 w) and then declines somewhat to about 87% efficiency at full load (1000 w). A "best efficiency" range can be determined by inspecting the efficiency plots. For converter A, a good efficiency range 320 can be somewhat arbitrarily defined as between about 450 W and full load 1200 W while a best efficiency range 322 is between about 45% and 55% of full load. Similarly for converter B, a good efficiency range 330 can be somewhat arbitrarily defined as between 600 W and 900 w, which is less than full load, while a best efficiency range 332 is between approximately 65% and 85% of full load.

The best efficiency ranges can also be determined dynamically by including A/D circuitry in each converter (not shown) to measure input AC current and voltage and thereby to calculate input power. The management subsystem of server 100 and server 200 then samples input power each time it samples converter output power, as discussed above. A history of the input and output power is then saved either locally or at the local or remote administration system and an efficiency curve is developed based on the dynamic samples. This allows the efficiency of the power converters to be monitored over time as they age. Based on the data from each power converter, a range of operation is determined that defines the best efficiency range for that converter. For example, the management system may determine the peak efficiency point, and then select for the best range any operating point that is within 1% of peak. Of course, other values may be selected to determine the best range. The administrative system may request a value to use, for example, from the administrator. The value may be different for different power converters that are used by different servers in the datacenter.

A feature of central processing unit (CPU) 110/210 is used both for power efficiency and power capping purposes. In OS control mode, the system will support dynamic power management through the operating system's policy mechanism. ACPI (Advanced Configuration and Power Interface) is an open industry specification co-developed by Hewlett-Packard, Intel, Microsoft, Phoenix, and Toshiba. ACPI establishes industry-standard interfaces enabling OS-directed configuration, power management, and thermal management of mobile, desktop, and server platforms. In this mode, the system BIOS creates the required ACPI tables to enable the operating system to support Intel's Demand Based Switching or AMD's PowerNow power management feature. For this mode, system administrators must configure the operating system to activate the OS-based power management feature. If the operating system does not support dynamic power management, or if the feature has not been configured through the operating system, the processor will always run in its highest power and performance state, unless dynamic power mode is enabled.

CPU performance states (P-states) enable privileged software to adjust the CPU frequency and voltage among as few as one or as many as five or six settings. P-states are commonly numbered from $P_0$ (the highest performance and power state) to $P_1$, $P_2$, etc. (as the performance and power is reduced). $P_0$ is commonly referred to as the "highest P-state" and $P_n$ (n>0) is commonly referred to as a "lower P-state."

It is expected that other subsystems such as memory and disk will develop equivalent features to P-states that trade-off performance for power. When such features are available, they can be used in combination with P-states in the same manner described herein to amplify the system-level power/performance trade-off.

Changing the power state (that is, the processor frequency and voltage) enables processors to operate at different power levels. Servers 100/200 have two mechanisms for limiting their performance and corresponding power dissipation, processor P-states and modulating STPCLK (stop clock) to the CPU. P-states are programmable by the BIOS ROM. For power capping, STPCLK modulation percentages (the fraction of time the clock is stopped) are set to n/8, where n is an integer between 0 and 7, inclusive, by the BIOS ROM writing to registers in the system chip set. Also, the STPCLK or equivalent input pin to the CPUs may be driven by a controller implemented in PAL 124/224. Thus, by using both P-states and by modulating STPCK a wide range of system performance and therefore power consumption can be created by management software and firmware operating on the server.

Things other than workload also affect server power consumption. For example, as ambient temperature rises, server cooling fans may have to spin faster to cools the server, even though the workload remains constant. Furthermore, as the CPUs rise in temperature, their power consumption rises. Also, different instruction sequences consume different amounts of power, even though they may appear to keep the CPUs equally busy (equal CPU utilization). The power capping algorithms described herein should accommodate all combinations of factors that could affect total server power.

Within manager 120/220 a power regulator routine uses a ROM-based algorithm to monitor processor activity. It adjusts processor power usage to match performance levels to the application load. Dynamic power savings mode can be supported whether or not an operating system supports Intel's Demand Based Switching or AMD's PowerNow and regardless of which operating system the server is running.

The power regulator determines the amount of time the processor is spending in the operating system's idle loop. When the ratio of time spent in the idle loop to the amount of time performing useful work is high, the algorithm instructs the processor to set its power state to $P_{min}$ (the lowest power and performance mode of the processor). Conversely, when the algorithm detects a low ratio indicating a high application load, the processor is switched in real time to $P_{max}$, (the highest power and performance mode of the processor). The monitoring and adjusting of P-states is performed independently for each processor in a system. Dynamic power savings mode allows the processors to operate in a low power state when high processor performance is not needed and in a high power state when high processor performance is needed. The dynamic power savings mode works for all operating systems, including VMware, and does not require OS configuration.

CPU utilization is determined by reading a performance event counter residing within the processor that is programmed to collect NON-HALTED clock cycles. This is an important event to harvest because modern operating systems deployed today execute a HLT instruction when idle, instead of spinning in an idle loop looking for work to do. Executing the HLT instruction during idle automatically brings the processor down to a low-power state, called the C1E, and stops incrementing the event counter of NON-HALTED clocks. The event counter is programmed to count kernel and user mode NON-HALTED clock cycles to properly account for processor utilization attributed to system software. Therefore, all processor activity (kernel-mode and user-mode) is accounted for in making power-state decisions. An interrupt pulls the processor out of the HLT instruction and restores the previous power state.

The power regulator algorithm continuously monitors application and processor loading every 125 ms in this embodiment. This essentially continuous monitoring results in optimized P-state transitions. The current and average P-state data may be displayed on-screen at the local or remote administration console.

Each server 100 and 200 includes circuitry within programmable array logic (PAL) 124/224 that is controlled by the management subsystem and connected to the chip set and other control points in the server for implementing power capping. In server 200, power measurement 230 is integrated into the power supply to improve accuracy. However, since this accurate power meter is too slow for electrical capping requirements, an electrical capping micro-computer (uC) in manager subsystem 220 monitors the analog output from the power supplies that is proportional to output current. Manager 120 performs this same function for server 100.

One purpose of an electrical cap for the servers is to limit power consumption of the server in such a way that changing workloads on the server do not cause any electrical problems for the data center, such as tripping circuit breakers. Since circuit breaker trip times are commonly tens or hundreds of ms at a 200% load, but sometimes are less than 100 ms, the electrical cap limits the maximum time above the cap to ~50 ms. In general, the design goal of electrical capping for servers 100/200 is to limit transients above the cap to be no larger (amplitude and time) than the power supply inrush current. By staying below this limit, no new breaker-sizing or timing requirements are introduced for the data center. Typically, an inrush current of approximately three times the operating current for up to 0.1 ms, and up to 50% over the operating current for several ms. can be tolerated.

Experiments that have been run on an embodiment of server 200 that indicate a uC running at a 1 kHz sampling rate with n/256 duty-cycle control of STPCLK can limit the power supply output overshoot to 25 W (less than ¼ A at 110 VAC) and 3 ms.

Electrical capping is also used to prevent server power consumption from exceeding the capacity of the power converters providing DC power to the server. As described above, when a server is not operating at full capacity the management system may place it in a lower power consumption mode and turn off or idle one or more parallel power converter(s) in order to cause the remaining enabled power converters to operate in a higher efficiency manner. A power cap is then set for the server so that a sudden increase in power consumption does not overload the remaining enabled power converters. This mode of operation is referred to herein as dynamic power management. The amount of overshoot that can be tolerated depends on the construction and cooling capacity of a particular power supply and will vary in different server embodiments. In general, a good target is to minimize an overshoot to last for no longer than 3-5 ms with an amplitude of less than 10% of the maximum capacity of the power converters. This will generally require dedicated power capping circuitry to provide an adequate time response.

FIG. 4 is a flow chart illustrating operation of a dynamic power management process 400 in the systems of FIG. 1 and FIG. 2. Servers 100/200 operate using standard ACPI conventions. When AC power is available, the system is in ACPI state S5, 402. When a power-on event is received for the server, the system transitions to DC power on state S0, 404. At 406 a test is made to determine if the server has more than one AC to DC power converter available. Management sub-system 120/220 can poll status bits or other indicators via an I2C bus or other mechanism to determine how many power converters are available.

If more than one converter is available, process 408 determines if less than all of the converters can supply the present server consumption needs. The present instantaneous consumption of the server is determined as described above with reference to FIGS. 1 and 2. The capacity of the power converters is determined by accessing a stored capacity value for each converter. In some embodiments, this value may be provided by the system administrator. In another embodiment, this value is provided by a non-volatile storage circuit included within the power converter that is accessible to the management subsystem. For example, manager subsystem 220 can access a stored capacity value in an EPROM (erasable programmable read only memory) or an EEPROM (electrically erasable programmable read only memory) located on each power converter 202a-202d via the I2C bus.

If the present power consumption level of the server can be provided by less than all of the available power converters, then process 410 determines a power capacity of a reduced number of power converters, sets a power cap at or below this value, and then turns off or otherwise places the presently unneeded converters in a disabled or standby mode. By setting the power cap at or below the reduced power converter capacity level, a safeguard is put in place that prevents the server from overloading the reduced number of converters if a sudden demand for an increase in power consumption should occur.

Once the power cap is in place, process 412 continuously monitors the server system to determine if an increase in power demand occurs such that the present consumption has risen to a point that present instantaneous consumption is equal to or very close to the power cap value. If the power consumption is at or near the power cap value, then process 414 implements the power cap process to throttle the server system so that power consumption does not exceed the cap, as described above. It is to be understood that a short overshoot of power consumption may occur while the throttle is being put in place, but as described above the overshoot will be short in amplitude and duration and will not cause the power converters to overload.

Process 416 then turns on or otherwise enables one or more additional power converters to provide the additional power consumption demand. Process 418 raises the power cap to agree with the additional power capacity and thereby allows the throttling process of 414 to be terminated.

Dynamic power management process 400 then returns to process 408 and continuously monitors the instantaneous power consumption of the server to determine when power demand has decreased enough to repeat the process of taking one or more converters offline into a standby or off mode.

Multi-level versions of the dynamic power management process are also possible, in which multiple supplies are turned off one after another as the power goes down and turned back on one after another as the power goes up. In such cases, the monitoring loop would check both for the need to turn on more supplies and the opportunity to turn off more supplies at each level.

The status of the various power converters, power capping values, present and average power consumption may be reported to the local or remote administration system via the manager subsystem so that the administrator can monitor the operation of the dynamic power management process.

Another aspect of the dynamic power management process is indicated at point 420 and will be described with respect to FIG. 5. As discussed above, a server system will generally provide two power converters for redundancy reasons so that the system can still operate at full performance even if one converter fails. The number of power converters may be increased if it is more cost effective to provide several lower capacity converters in parallel rather than two full capacity converters. For example, if the server requires 1500 W to operate at full performance, four 500 W converters may be provided. In this case, even if one converter fails, the remaining three can still provide full power needs.

A larger number of converters may also be provided to allow finer granularity operation of the dynamic power management process. Referring again to FIG. 3, notice that range 320 indicates an operating range for power converter A that has good efficiency between about 40% to 100% of full capacity, while its best efficiency range 322 is between about 45% and 55% of full load. Similarly, range 330 indicates a good operating range for power converter B that is between about 60% to 90% of full capacity, while its best efficiency range 332 is between about 65% and 85% of full load. Of course, other converters may have good and best efficiency ranges that are different from these two representative converters.

In the example above of a system that has four 500 W converters, when the system is running at full performance demanding 1500 W, one converter can be turned off and the other three can still provide the full 1500 W; however, by determining the best efficiency range of the converters, as shown at 502, it may be determined that a best efficiency range is between 65%-85%, for example. For each 500 W converter that would be between 325 and 425 W. Thus, all four converters can provide 1500 W at 375 W each more efficiently than just three converters at 500 W each, and therefore four converters would be selected at process 504. However, if the power level drops to, say, 1000 W due to less load on the system, then three converters would be more efficient at 333 W each than either two at 500 W or four at 250 w, therefore three would be selected at process 504.

Figure 6:
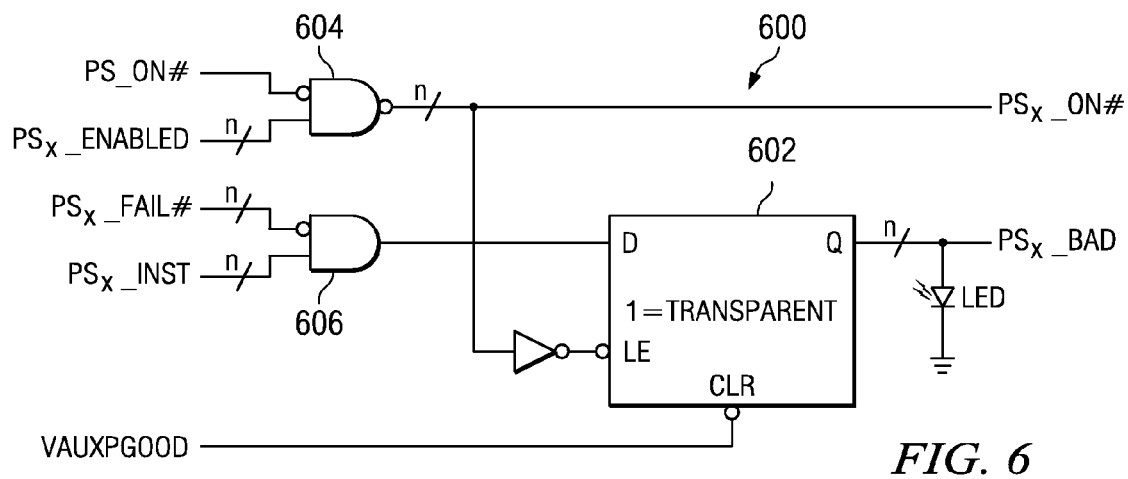
FIG. 6 is a schematic of a control circuit for status indicators for the power converters of FIG. 1 and FIG. 2.

FIG. 6 is a schematic of a control circuit for status indicators for the power converters of FIG. 1 and FIG. 2. Server 100/200 has Field Replaceable Unit LEDs for each replaceable part in the server. In FIG. 1 these are labeled LED for power converters 102a-102n. In the past, AC to DC converters were all turned on or turned off together in response to ACPI state S0, as discussed with respect to FIG. 4. If a PS_FAIL# signal from an AC to DC converter was asserted, the hardware could assume that that converter was failed and light its associated LED. With individual power converter enabling, an AC to DC converter that is not enabled will look like it is "bad" because it will assert PSx_FAIL#. The server embodiments herein only light LEDs of bad AC to DC converters when the converter's individual PSx_ON# signal is asserted.

Circuit 600 is repeated a total of n times, one for each parallel connected field replaceable power supply that operates under the dynamic power management process. When ACPI state S0 is entered, PS_ON# is asserted (logic level 0) to indicate all of the power converters are to be turned on. A power supply enable register, not shown, is provided in each server that is powered by the auxiliary voltage such that it retains state as long as AC is available (ACPI state S5). There is a signal output PSx_ENABLED from the PS enable register for each power converter in the server. The PS enable register is controlled by the manager subsystem to indicate when each converter is to be enabled or disabled, as discussed above. Signal PSx_ON# is asserted (logic 0) by gate 604 to indicate the respective power supply is enabled for turn on. Note, the "x" in the signal names herein refer generically to one of the "n" parallel connected power converters connected to the server.

Signal PSx_INST indicates a respective field replacable power supply is installed. When the power supply module is inserted in the server, circuitry in the module causes the PSx_INST signal for that power supply to be asserted. Manager subsystem 120/220 can access the PSx_INST signal for each power supply to determine how many power supplies are installed. Signal PSx_FAIL indicates when the respective power supply is not producing an output voltage. Thus, if the power supply is either turned off or disabled this signal is asserted and would imply the power supply is failed, when it may only be disabled.

Latch 602 provides signal PSx_BAD that is connected to the LED associated with each power supply to indicate an error condition for the associated power supply. Latch 602 is transparent when the latch enable (LE) input is logic 1 such that when PSx_ON# is 0 (asserted) indicating the respective AC to DC converter is enabled any assertion of signal PSx_FAIL# from the respective power supply while signal PSx_INST from the same respective power supply is asserted will cause the output of gate 606 to go high which will propagate through transparent latch 602 and cause the associated LED to light. PSx_BAD is connected to the anode of the LED. Additionally, software can monitor this for error detection. In this manner, an error LED will be illuminated only if the power converter is enabled but is not producing power.

Figure 7:
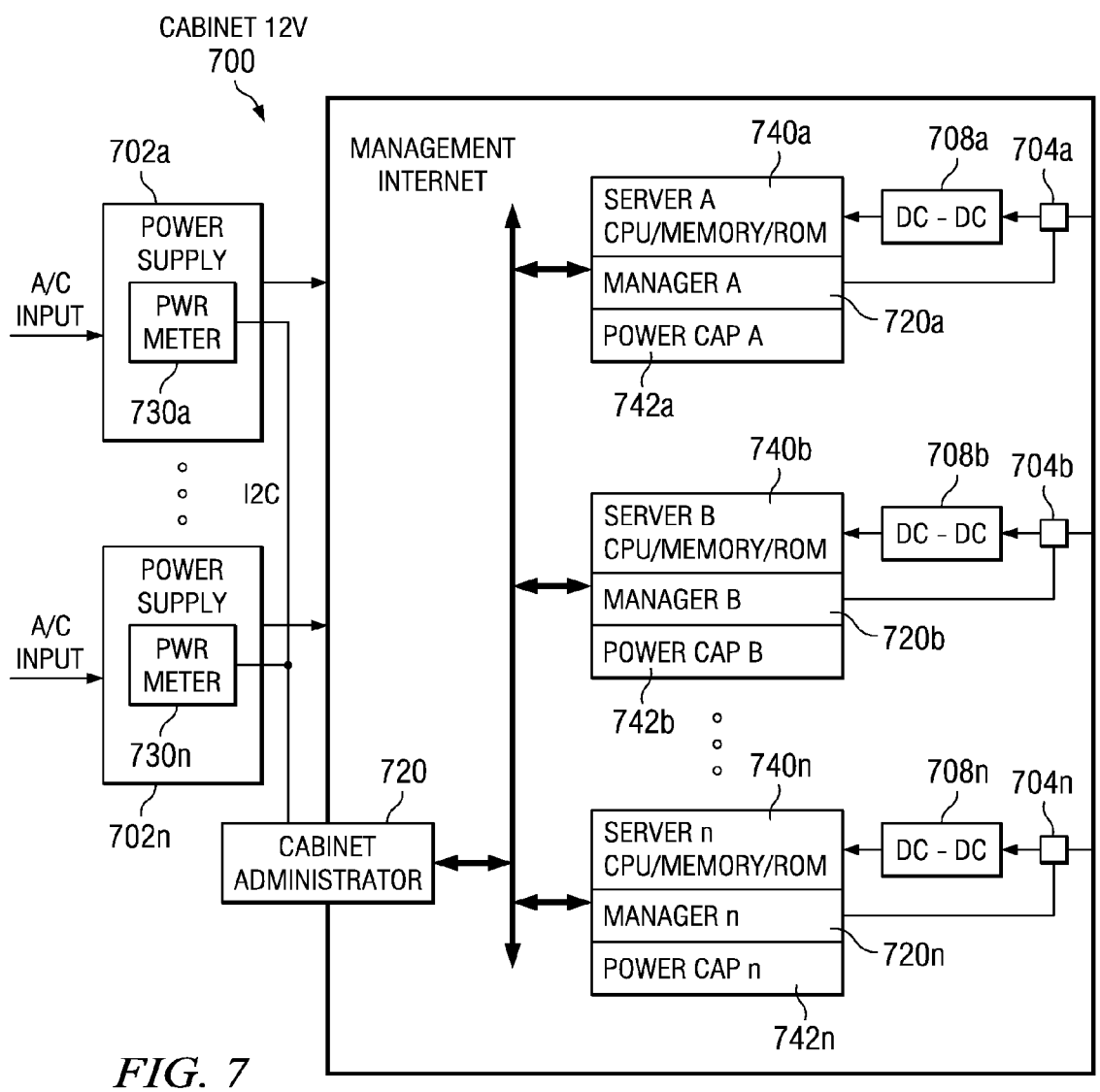
FIG. 7 is a block diagram of a computer system with multiple parallel AC to DC converters supplying several servers.

FIG. 7 is a block diagram of a computer system 700 with multiple parallel connected AC to DC converters 702a-702n supplying a set of servers 740a-740n. Such a system is generally enclosed in a cabinet or other type of chassis enclosure. Each cabinet may then be mounted in a rack enclosure, for example. Each individual server is similar to the servers described with respect to FIG. 1 or FIG. 2, and are generally referred to as blade servers, although other server embodiments are envisioned. The entire set of servers 740a-740n receive cabinet 12v DC from the parallel connected power converters. DC_DC converters 708a-708n receive the cabinet 12v DC and convert it to whatever voltage Vcc is required to operate the various components of each server. It is to be understood that other embodiments may use a different voltage level than 12v to distribute the cabinet level power.

Cabinet administration system 720 monitors the parallel connected power converters using power monitors 730a-730n in a similar manner as described above with respect to FIGS. 1 and 2 to determine how many are installed and available, power capacity and power currently being provided to the servers. Each server includes a manager subsystem 720a-n that monitors server computation load and adjusts power usage accordingly in a similar manner as described above. Administration system 720 can direct one or more of the power converters to be turned off or otherwise disabled when full power capacity is not needed, and then to turn on additional converters as needed.

Each server 740 also includes power capping circuitry 742a-n that is controlled by the respective manager subsystem 720a-n to provide a throttle on each server so that the capacity of the enabled power converters is not exceeded when one or more power converter has been turned off. Administration system 720 communicates with the individual servers via a management internet and provides a pro-rated power cap value for each server, based on the available capacity of the power converters. Each server includes a local power detection circuit 704a-n that is similar to detection circuit 104 described above. If an individual server begins to consume power that exceeds the cap value, then throttling is invoked on that server to reduce power consumption below the power cap value.

As discussed above, computer system 700 is typically headless and is controlled from a local or remote administration system via the management internet connection or other suitable local or wide area communication system. As used herein, the terms "applied," "connected," and "connection" mean electrically connected, including where additional elements may be in the electrical connection path. "Associated" means a controlling relationship, such as a memory resource that is controlled by an associated port. The terms assert, assertion, de-assert, de-assertion, negate and negation are used to avoid confusion when dealing with a mixture of active high and active low signals. Assert and assertion are used to indicate that a signal is rendered active, or logically true. De-assert, de-assertion, negate, and negation are used to indicate that a signal is rendered inactive, or logically false. The term "turn off" of "turning off" means turning off, placing in standby mode, disabling or otherwise placing the power converter into a non-active offline or very low power dissipation state. Similarly, the term "turn on" or "turning on" means placing the power converter into an active online power state.

While the invention has been described with reference to illustrative embodiments, this description is not intended to be construed in a limiting sense. Various other embodiments of the invention will be apparent to persons skilled in the art upon reference to this description. For example, in another embodiment, DC to DC converters 208a-208n may be dynamically managed for efficient operation as described herein. In another embodiment, parallel power converters that provide power to more than one server may be dynamically managed for efficient operation as described herein.

In another embodiment, parallel power converters for physical devices such as disk drives or memory banks may be dynamically managed for efficient operation as described herein.

In another embodiment, a large number of parallel connected power converters may be dynamically managed for efficient operation as described herein. For example, 110 power converters each having a capacity of 20 W can be connected in parallel to provide fine granularity with ten unit redundancy for a 2000 W load and may be dynamically managed for efficient operation as described herein.

In another embodiment, the power converters may be arranged in redundant pairs such that each one of the pair is provided by a separate primary AC system in order to provide further fault tolerance in case one AC primary source fails. In such an arrangement, the power converters may be turned on and off in pairs to dynamically manage power while retaining hot standbys, or the power converters may be turned on and off one at a time without maintaining full hot redundancy while using the power cap and throttling mechanism described herein to handle loss of one of the primary AC sources.

It is therefore contemplated that the appended claims will cover any such modifications of the embodiments as fall within the true scope and spirit of the invention.

What is claimed is:

1. A method for dynamically managing power consumption in a computer system having at least two parallel power converters, comprising:

determining a maximum power capacity for each of the power converters;

monitoring power consumption of the computer system;

dynamically measuring an input power associated with each of the power converters over time;

saving samples of the measured input power over time to dynamically generate an efficiency curve to determine the most efficient operating range for each of the power converters;

selectively turning off one or more of the power converters based on the most efficient operating range determined for each of the power converters if the power consumption of the computer system can be provided by less than all of the parallel power converters, such that a reduced number of parallel power converters remains turned on;

determining a reduced maximum power capacity of the reduced number of parallel power converters;

setting a power cap value for the computer system that is less than or equal to the reduced maximum power capacity; and throttling the computer system if power consumption of the computer system reaches the power cap value to prevent power consumption of the computer system from exceeding the reduced maximum power capacity.

2. A method for dynamically managing power consumption in a computer system having at least two parallel power converters, comprising:

determining a maximum power capacity for each of the power converters;

monitoring power consumption of the computer system;

turning off one or more of the power converters if the power consumption of the computer system can be provided by less than all of the parallel power converters, such that a reduced number of parallel power converters remains turned on;

determining a reduced maximum power capacity of the reduced number of parallel power converters;

setting a power cap value for the computer system that is less than or equal to the reduced maximum power capacity; and throttling the computer system if power consumption of the computer system reaches the power cap value to prevent power consumption of the computer system from exceeding the reduced maximum power capacity of the reduced number of parallel power converters;

turning on one or more additional parallel power converters if power consumption of the system approximately equals the power cap value; and increasing the power cap value in accordance with additional power capacity of the additional parallel power converters.

3. The method of claim 2, further comprising:

determining a most efficient operating range for at least one of the parallel power converters; and selecting a number of power converters to remain turned on such that at least one of the parallel power converters operates in the most efficient operating range.

4. The method of claim 2, further comprising controlling a failure indicator associated with one of the power converters such that a failure is not indicated if the power converter is turned off but that a failure is indicated if the power converter is enabled but not producing power.

5. The method of claim 1, wherein monitoring power consumption comprises monitoring a plurality of sensors.

6. The method of claim 2, wherein throttling the computer limits power consumption overshoot to less than 10% of maximum capacity of the power converters.

7. The method of claim 2, further comprising reporting the power cap value and the number of converters that remain turned onto a remote or a local administrative system.

8. A computer system with dynamically managed power consumption, comprising:

a processor and memory complex connected to receive power from two or more parallel connected power converters;

circuitry for monitoring power consumption of the computer system;

a management subsystem connected to the processor and to the power converters and configured to determine a maximum power capacity for each of the power converters; to turn off one or more of the power converters if the power consumption of the computer system can be provided by less than all of the parallel power converters, such that a reduced number of parallel power converters remains turned on; to determine a reduced maximum power capacity of the reduced number of parallel power converters; and to set a power cap value for the computer system that is less than or equal to the reduced maximum power capacity;

circuitry connected to the processor responsive to the management system to throttle the computer system if power consumption of the computer system reaches the power cap value to prevent power consumption of the computer system from exceeding the reduced maximum power capacity; and a failure indicator associated with one of the power converters circuitry connected to control the failure indicator such that a failure is not indicated if the power converter is turned off but that a failure is indicated if the power converter is enabled but not producing power.

9. The computer system of claim 8, wherein the management system is further configured:

to turn on one or more additional parallel power converters if power consumption of the system equals the power cap value; and to increase the power cap value in accordance with additional power capacity of the additional parallel power converters.

10. The computer system of claim 9, wherein the management system is further configured:

to determine a most efficient operating range for at least one of the parallel power converters; and to select a number of power converters to remain turned on such that at least one of the parallel power converters operates in the most efficient operating range.

11. The computer system of claim 8, wherein the circuitry for monitoring power consumption comprises a plurality of sensors.

12. The computer system of claim 8, further comprising communication circuitry connected to the management subsystem for reporting the power cap value and the number of converters that remain turned on to a remote or a local administrative system.

13. The computer system of claim 12, further connected to a plurality of computer systems with dynamically managed power consumption all located in a data center and all connected to the remote or to the local administrative system.

14. A computer system with dynamically managed power consumption, comprising:

a processor and memory complex connected to receive power from two or more parallel connected power converters;

means for determining a maximum power capacity for each of the power converters;

means for monitoring power consumption of the computer system;

means for turning off one or more of the power converters if the power consumption of the computer system can be provided by less than all of the parallel power converters, such that a reduced number of parallel power converters remains turned on;

means for determining a reduced maximum power capacity of the reduced number of parallel power converters;

means for setting a power cap value for the computer system that is less than or equal to the reduced maximum power capacity;

means for throttling the computer system if power consumption of the computer system reaches the power cap value to prevent power consumption of the computer system from exceeding a maximum power capacity of the reduced number of parallel power converters;

means for turning on one or more additional parallel power converters if power consumption of the system equals the power cap value; and means for increasing the power cap value in accordance with additional, power capacity of the additional parallel power converters.

15. The computer system of claim 14, further comprising:
means for determining a most efficient operating range for at least one of the parallel power converters; and means for selecting a number of power converters to remain turned on such that at least one of the parallel power converters operates in the most efficient operating range.

16. The computer system of claim 14, further comprising a failure indicator associated with one of the power converters and means for controlling the failure indicator such that a failure is not indicated if the power converter is turned off but that a failure is indicated if the power converter is enabled but not producing power.

17. A computer system with dynamically managed power consumption, comprising:

two or more parallel connected power-converters;

a plurality of processing units, each processing unit comprising:

a processor and memory complex connected to receive power from the power converters; and circuitry connected to the processor operable to throttle the processing unit to prevent power consumption of the processing unit from exceeding a power cap value;

the computer system further comprising:

circuitry for monitoring power provided by the power converters; and a management subsystem connected to each of the processing units and to the power converters and configured to determine a maximum power capacity for each of the power converters; to determine a most efficient operating range for at least one of the parallel power converters; to select a number of power converters to remain turned on such that at least one of the parallel power converters operates in the most efficient operating range; to turn off one or more of the other power converters if the power provided by the power converters can be provided by less than all of the parallel power converters, such that a reduced number of parallel power converters remains turned on; to determine a reduced maximum power capacity of the reduced number of parallel power converters; and to set a power cap value for each processing unit such that a total of all of the power caps is less than or equal to the reduced maximum power capacity.

18. The computer system of claim 17, wherein the management system is further configured:

to turn on one or more additional parallel power converters if power provided by the power converters equals the total power cap value; and to increase the power cap values in accordance with additional power capacity of the additional parallel power converters.

19. The computer system of claim 17, wherein the management system is further configured:

to dynamically measure an input power associated with each of the power converters over time; and to save samples of the measured input power over time to dynamically generate an efficiency curve to determine the most efficient operating range for each of the power converters.

* * * * *

UNITED STATES PATENT AND TRADEMARK OFFICE
CERTIFICATE OF CORRECTION

PATENT NO. : 7,895,455 B2  Page 1 of 1
APPLICATION NO. : 11/768102
DATED : February 22, 2011
INVENTOR(S) : Alan M. Green et al.

It is certified that error appears in the above-identified patent and that said Letters Patent is hereby corrected as shown below:

In column 15, lines 9-14, in Claim 15, delete "The computer system of claim 14, further comprising:
      means for determining a most efficient operating range for at least one of the parallel power converters; and means for selecting a number of power converters to remain turned on such that at least one of the parallel power converters operates in the most efficient operating range." and
      insert -- The computer system of claim 14, further comprising:
      means for determining a most efficient operating range for at least one of the parallel power converters; and
      means for selecting a number of power converters to remain turned on such that at least one of the parallel power converters operates in the most efficient operating range. --, therefor.

In column 15, line 23, in Claim 17, delete "power-converters;" and
      insert -- power converters; --, therefor.

Signed and Sealed this
Twenty-sixth Day of April, 2011

David J. Kappos
*Director of the United States Patent and Trademark Office*